July 30, 1929.  W. J. ATWELL ET AL  1,722,321
CAGE TRAP
Filed Sept. 22, 1927  2 Sheets-Sheet 1
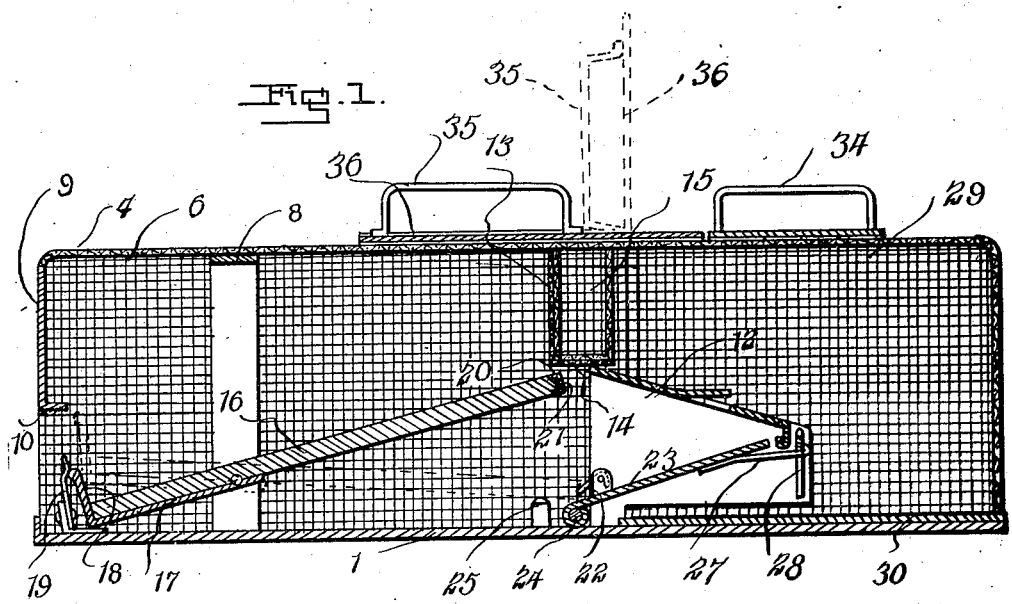
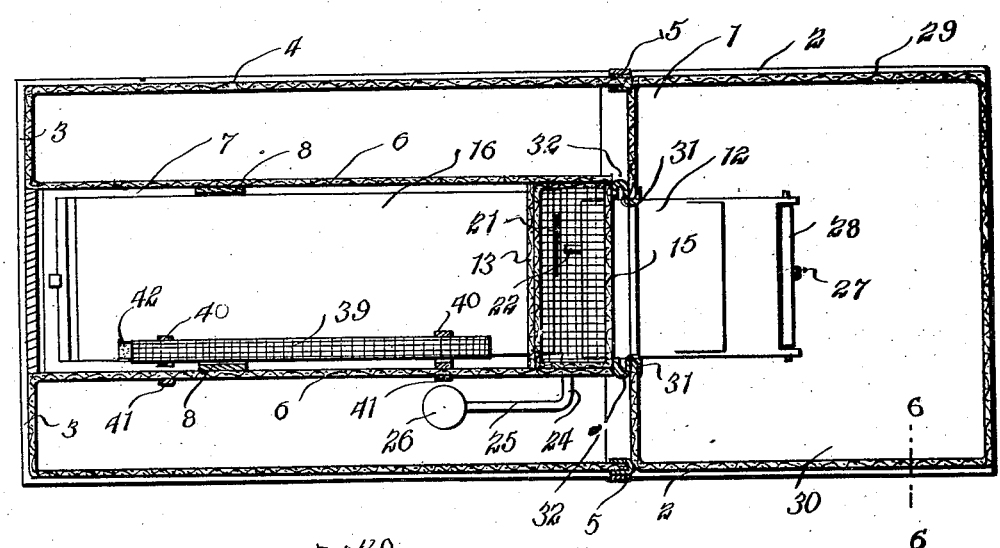
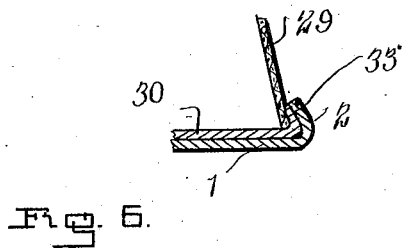
Inventor
W. J. Atwell
E. W. Kinzer
By Lacey & Lacey, Attorneys July 30, 1929.  W. J. ATWELL ET AL  1,722,321
CAGE TRAP
Filed Sept. 22, 1927  2 Sheets-Sheet 2

Inventor
W. J. Atwell
E. W. Kinzer
By Lacey & Lacey, Attorneys

Patented July 30, 1929.

1,722,321

UNITED STATES PATENT OFFICE.

WILLIAM J. ATWELL AND EDWARD W. KINZER, OF BOISSEVAIN, VIRGINIA; SAID ATWELL ASSIGNOR TO SAID KINZER.

CAGE TRAP.

Application filed September 22, 1927. Serial No. 221,284.

This invention relates to fishing and trapping and more particularly to a trap in which rats and other small animals may be caught and confined alive in a confining chamber.

One object of the invention is to provide a trap having an entrance chamber communicating with a confining chamber which is removable so that animals in the confining chamber may be carried to a place of disposal without disturbing the remainder of the trap.

Another object of the invention is to provide the body of the trap which includes the entrance chamber with a lifting member detachable therefrom and when detached adapted to be disposed in closing relation to an inlet for the confining chamber and thereby prevent animals from escaping when the confining chamber is detached from the body of the trap.

Another object of the invention is to pivotally mount platforms in the entrance chamber and passage leading to the confining chamber in such relation to each other that when the platform in the entrance chamber is swung downwardly by the weight of an animal and closes the inlet of this chamber it will be engaged by a latch carried by the platform in the passage and retained in closing relation to the inlet of the entrance chamber until an animal passes through the passage and thereby moves the platform in this passage downwardly and releases the first platform.

Another object of the invention is to provide the trap with a bait holder so located that it can be very easily removed and after being refilled replaced while the confining chamber is detached from the body of the trap.

The invention is illustrated in the accompanying drawings, wherein

Figure 1 is a view showing the improved trap in longitudinal vertical section;

Fig. 2 is a horizontal sectional view taken longitudinally through the trap;

Fig. 6 is a fragmentary sectional view taken on the line 6—6 of Fig. 2.

Figure 3:
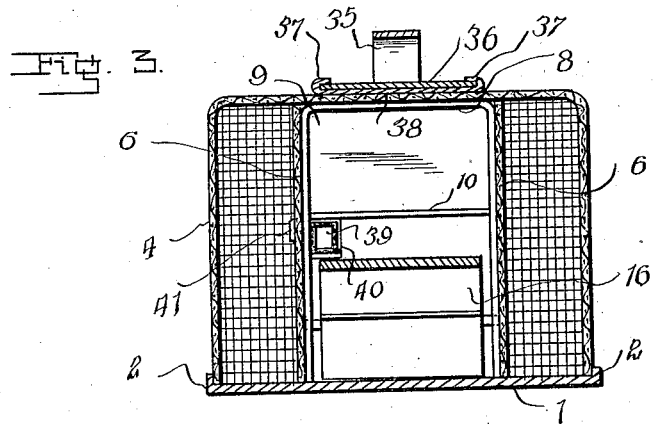
Fig. 3 is a transverse vertical sectional view through the trap looking toward the entrance end thereof.
Figure 4:
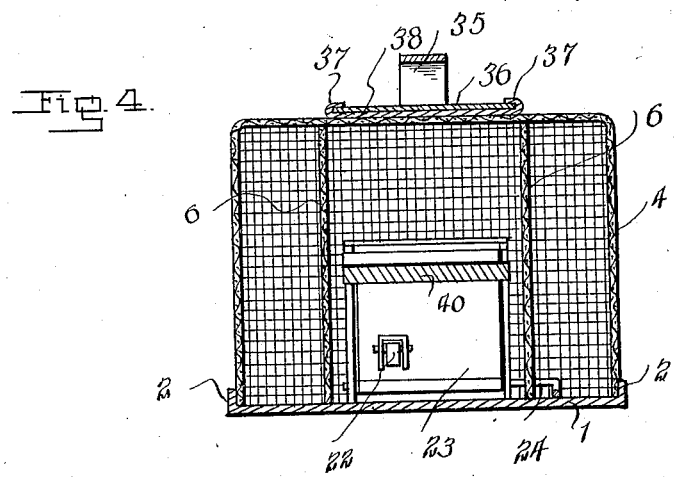
Fig. 4 is a similar view looking towards the inner or outlet end of the entrance chamber.
Figure 5:
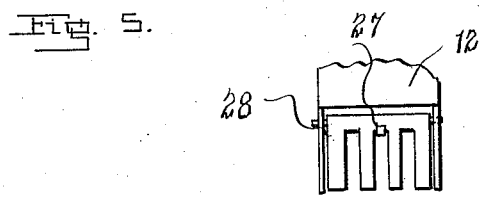
Fig. 5 is a fragmentary view of the outer end of the passage leading from the entrance chamber.

The trap includes a body having a bottom 1 formed of sheet metal and provided with side flanges 2 and at its forward end with flanges 3 extending from its sides but terminating in spaced relation to each other. The body 4 is formed of strong wire and at its bottom is soldered or otherwise firmly secured to the flanges 2 and 3. It should be noted that the body 4 terminates intermediate the length of the bottom 1 and at its rear or inner end has its side walls bound by metal strips 5, the lower ends of which straddle the flanges 2. Inner walls 6 of wire extend longitudinally in the body to define an entrance chamber 7, and this entrance chamber has its walls and top braced intermediate its length by a metal yoke 8 having its upper bridge soldered or otherwise secured to the top of the body and its depending arms soldered to the walls 6 and to the bottom 1. The outer end of the entrance chamber is partially closed by a meal plate 9 which terminates in spaced relation to the bottom of the chamber in order to define an inlet opening and this plate has its lower end portion bent inwardly to provide a flange 10, the purpose of which will be hereinafter brought out. At its inner end the entrance chamber is provided with an outlet from which leads a passage or tunnel 12 formed of sheet metal and above the tunnel is provided an end wall 13 having its lower portion bent, as shown at 14, and defining a pocket to receive a bait box 15. The bait box is also formed of wire and is open at its upper end so that bait attractive to the animals which it is desired to catch may be easily placed in the bait box. The bait box fits snugly into the pocket formed by the wall 13 but an animal in the trap cannot reach the bait and consume it.

Within the entrance chamber is disposed a platform 16 which is pivotally mounted between the arms of the yoke 8 and has its forward or outer end portion reinforced by a metal plate 17 terminating at its outer end in an upstanding flange 18 adapted to be engaged by a latch 19 at the inlet to the entrance chamber. This latch which consists of a strip of resilient metal will serve to prevent the platform from tilting too freely and causing an animal to become alarmed before the platform has had an opportunity to swing downwardly at its inner end the necessary distance to properly entrap the animal. The inner end of the platform is provided with a metal binding 20 and this binding is provided with a slot 21 to receive a latch 22 carried by a platform 23 which is disposed longitudinally in the tunnel 12 and pivotally mounted through the medium of a shaft 24. The shaft 24 extends transversely through the entrance chamber and has one end portion projecting therefrom and bent to provide a lever 25 carrying a weight 26. In view of the fact that the platform 23 is rigidly secured to the shaft 24, the weight will serve to normally retain this platform in the position shown in Fig. 1 and the latch 22 will be disposed to engage in the slot or seat 21 and retain the platform 16 swung downwardly out of its normal position until an animal steps upon the platform 23 and releases the platform 16. When the inner end of the platform 16 is resting upon the support or bumper 25 and engaged by the latch 22, the outer end portion of this platform will be elevated and since the flange 18 will be disposed close to the flange 10 of the wall 9 an animal will be prevented from escaping out of the entrance chamber except by way of the tunnel 12. When the platform 23 is moved downwardly by the weight of an animal, the platform 16 returns to its normal position where it is held by the latch 19 and the latch arm 27 which projects forwardly from the platform 23 is moved out of engagement with the swinging door 28 thereby allowing the animal to pass freely through the tunnel into the confining chamber 29. As soon as the animal passes from the tunnel into the confining chamber, the weight 26 returns the platform 23 to a raised position and the latch arm will again engage the pivoted door and prevent the door from opening. It will thus be seen that an animal will be prevented from escaping from the confining chamber.

The confining chamber is also formed of wire, except its bottom 30, which consists of sheet metal and has its inlet opening through which the tunnel passes bound by metal strips 31 which have their outer portions rebent to define tracks 32. The portions of the flanges 2 which project from the body 4 converge upwardly and overlie similarly disposed flanges 33 of the bottom 30 so that the confining chamber may be slid into and out of place upon the bottom 1 of the body but will not accidentally become detached. In order to carry the confining chamber, there has been provided a handle 34 and as carrying means for the body there is employed a handle 35 having a base consisting of a metal plate 36 of greater length than the handle and slidably engaged beneath the side flanges 37 of a track forming plate 38 soldered or otherwise rigidly secured upon the top of the body. The base plate 36 is of such width that when it is slid out of engagement with the flanges 37 it may be disposed vertically, as indicated by dotted lines in Fig. 1, and slid downwardly into engagement with the flanges or tracks 32 and close the inlet of the confining chamber. Therefore, the confining chamber may be removed without danger of the animals escaping.

When the trap is in use, bait is placed in the bait holder 15. We have also provided a bait holder disposed directly in the entrance chamber and consisting of a tube 39 formed of wire and carrying collars 40 which fit about the tube near its ends and are provided with tongues 41 adapted to be passed through a side wall of the confining chamber and suspend the tube from this wall, as shown in Figs. 2 and 3. A removable plug 42 closes one end of the tube so that the bait will be retained therein and an animal prevented from obtaining access to the interior of the tube. When an animal enters the trap, it steps upon the platform and moves towards the inner end thereof. As the animal advances, its weight causes the platform to tilt and its inner end swings downwardly so that it is engaged by the latch 22. This causes the platform to be retained in the tilted position and the inlet to the entrance chamber also closed by the outer end portion of the platform. Therefore, the only way in which the animal can escape from the entrance chamber is through the tunnel 12 and as the animal passes through this tunnel and steps upon the platform 23 this platform will be swung downwardly thereby releasing the platform 16 which will return to its normal position. After the animal passes out of the tunnel, the door 28 will return to a closed position and since the weight 26 will return the platform 23 to its normal position the latch arm 27 will engage the door and securely lock the door. Therefore, the animal will be confined in the confining chamber and cannot escape. When the owner of the trap finds an animal in the confining chamber, he removes the handle 35 together with its base from the body and slides the base into engagement with the tracks 32. He then gradually moves the confining chamber away from the body of the trap and at the same time forces the plate 36 downwardly until the confining chamber has been moved out of contact with the tunnel and the entrance to the confining chamber is completely closed. The confining chamber can then be grasped by its handle 34 and carried to a place where the animals may be killed or otherwise disposed of if it is desired to keep them alive. If desired the base plate 36 may be allowed to extend across the top of the confining chamber when engaged with the flanges 37 in order to brace the confining chamber and prevent danger of it accidentally moving out of proper engagement with the flanges 2. We have, therefore, provided a trap in which a number of animals may be confined in a confining chamber and each restores the platform in the entrance chamber to its original position as it passes through the tunnel into the confining chamber.

Having thus described the invention, we claim:

1. In a trap, a body including an entrance chamber having an inlet, a confining chamber removably carried by said body and having an inlet communicating with the entrance chamber when the confining chamber is in place upon the body, and a handle for said body having a base removably engaged therewith and when removed from the body constituting a closure for the inlet of the confining chamber.

2. In a trap, a body including an entrance chamber having an inlet and an outlet the bottom of the body extending from the wall of the entrance chamber having the outlet formed therein, a confining chamber resting upon the extended portion of said bottom and having a wall formed with an inlet disposed in operative relation to the outlet of the entrance chamber, means to releasably secure the confining chamber, and a handle for the body removable therefrom and when removed adapted to close the inlet of the confining chamber.

3. In a trap, a body including an entrance chamber having an inlet and an outlet, the bottom of the body extending from the wall of the entrance chamber having the outlet formed therein, a confining chamber resting upon the extended portion of said bottom and having a wall formed with an inlet disposed in operative relation to the outlet of the entrance chamber, means to releasably secure the confining chamber, a tunnel extending from the outlet of the entrance chamber through the inlet of the confining chamber, vertical tracks at the sides of the inlet of the confining chamber, and a handle for said body having a base plate releasably connected with the body and adapted to be engaged with said tracks and slid into closing relation to the inlet of the confining chamber as the confining chamber is removed.

4. In a trap, a body having a top, side walls, inner and outer end walls, and a bottom projecting from the inner end wall, the outer end wall having an inlet, a tunnel extending from the inner end wall and constituting an outlet, a confining chamber resting upon the extended portion of said bottom and having its inner end wall provided with an opening through which said tunnel passes, flanges extending upwardly from the bottom and engaging opposite sides of the confining chamber to slidably mount the same for movement into and out of engagement with the bottom, tracks at opposite sides of the opening in said confining chamber, and a handle for said body having a base plate releasably connected therewith and when in place having a portion overlapping the confining chamber, the base plate of said handle when removed from the body being adapted to be engaged with said tracks and slid into closing relation to the opening in the confining chamber.

5. In a trap, a body having a top, side walls, inner and outer end walls, and a bottom projecting from the inner end wall, the outer end wall having an inlet, a tunnel extending from the inner end wall and constituting an outlet, the inner end wall above the tunnel having a recess, a bait holder seated in the recess and removable therefrom, and a confining chamber releasably held upon the extended portion of said bottom and having its inner end wall engaging the inner end wall of the body and extending across the recess to retain the bait holder within the recess and formed with an opening through which said tunnel passes.

6. In a trap, an entrance chamber having an inlet, a confining chamber, a passage leading from the entrance chamber to the confining chamber, a platform in said entrance chamber pivoted therein and normally extending at an upward incline from the inlet thereof towards said passage and when tilted by the weight of an animal moving into guarding relation to the inlet, a platform pivotally mounted in said passage, a latch carried by the second platform to engage the first platform and hold the same tilted until the second platform is depressed by the weight of an animal, and means to yieldably resist downward movement of the second platform.

7. In a trap, an entrance chamber having an inlet, a confining chamber, a passage leading from the entrance chamber to the confining chamber, a platform in said entrance chamber pivoted therein and normally extending at an upward incline from the inlet thereof towards said passage and when tilted by the weight of an animal moving into guarding relation to the inlet, a drop gate pivotally mounted at the outer end of said passage and opening outwardly, a platform pivotally mounted in said passage and normally extending at an upward incline towards its free outer end, a latch carried by the inner end of the second platform to engage the inner end of the first platform and hold the same depressed until the second platform is moved downwardly by the weight of an animal, and a latch strip extending from the outer end of the second platform to engage the drop gate and releasably hold the drop gate in a closed position.

8. In a trap, a body having a top, side walls, inner and outer end walls, and a bottom and constituting an entrance chamber, the outer end wall having an inlet opening, a tunnel leading from the inner end wall and constituting an outlet, a platform in the entrance chamber between the inlet and tunnel and pivotally mounted with its outer end normally resting upon the bottom adjacent the inlet and its inner end in an elevated position close to the tunnel, means in the tunnel to engage the inner end of the platform when moved downwardly by the weight of an animal in the entrance chamber and retain the platform in the set position with its outer end in guarding relation to the inlet until said means is released by the animal entering the tunnel, and a confining chamber having an opening through which said tunnel extends into the confining chamber.

9. In a trap, a body having a top, side walls, inner and outer end walls, and a bottom and constituting an entrance chamber, the outer end wall having an inlet opening, a tunnel leading from the inner end wall and constituting an outlet, a platform in the entrance chamber between the inlet and tunnel and pivotally mounted with its outer end normally resting upon the bottom adjacent the inlet and its inner end in an elevated position close to the tunnel, a platform in the tunnel pivotally mounted at its inner end and normally extending upwardly towards its outer end, a latch adjacent the pivoted end of the platform in said tunnel to engage the inner end of the platform in the entrance chamber when swung downwardly by the weight of an animal in the entrance chamber and secure the last-mentioned platform with its outer end in guarding relation to the inlet until the animal enters the tunnel and depresses the platform therein, and a confining chamber provided with an opening through which the animal passes.

10. In a trap, an entrance chamber having an inlet, a confining chamber, a passage leading from the entrance chamber to the confining chamber, a platform in said entrance chamber movably mounted therein and normally disposed out of closing relation to the inlet and adapted to be moved by an animal into guarding relation to the inlet, a platform movably mounted in said passage, a latch carried by the second platform to engage the first platform and hold the same in position to guard the inlet until the second platform is moved out of its normal position by an animal passing through the passage, and means to yieldably resist movement of the second platform out of its normal position.

In testimony whereof we affix our signatures.

WILLIAM J. ATWELL. [L. S.]
EDWARD W. KINZER. [L. S.]